(12) United States Patent
Rhoads et al.

(10) Patent No.: US 7,197,160 B2
(45) Date of Patent: Mar. 27, 2007

(54) GEOGRAPHIC INFORMATION SYSTEMS USING DIGITAL WATERMARKS

(75) Inventors: Geoffrey B. Rhoads, West Linn, OR (US); Neil E. Lofgren, White Salmon, WA (US); Philip R. Patterson, Sherwood, OR (US)

(73) Assignee: Digimarc Corporation, Beaverton, OR (US)

( * ) Notice: Subject to any disclaimer, the term of this patent is extended or adjusted under 35 U.S.C. 154(b) by 812 days.

(21) Appl. No.: 10/423,834

(22) Filed: Apr. 25, 2003

(65) Prior Publication Data

US 2004/0008866 A1 Jan. 15, 2004

Related U.S. Application Data

(63) Continuation-in-part of application No. 10/002,954, filed on Oct. 23, 2001, now Pat. No. 7,042,470, which is a continuation-in-part of application No. 09/800,093, filed on Mar. 5, 2001, now Pat. No. 7,061,510, application No. 10/423,834, which is a continuation-in-part of application No. 10/100,233, filed on Mar. 13, 2002, now Pat. No. 6,664,976, and a continuation-in-part of application No. 09/858,336, filed on May 15, 2001, now Pat. No. 7,098,931.

(60) Provisional application No. 60/383,474, filed on May 23, 2002, provisional application No. 60/376,720, filed on Apr. 29, 2002, provisional application No. 60/284,776, filed on Apr. 18, 2001, provisional application No. 60/284,163, filed on Apr. 16, 2001.

(51) Int. Cl.
*G06K 9/00* (2006.01)
(52) U.S. Cl. .................... 382/100; 359/1; 359/296; 345/522

(58) Field of Classification Search ........... 382/100, 382/107, 154; 345/84, 85, 522, 606, 698; 359/296, 1; 348/144
See application file for complete search history.

(56) References Cited

U.S. PATENT DOCUMENTS

| | | | |
|---|---|---|---|
| 4,504,910 A | 3/1985 | Araki et al. |
| 4,631,678 A | 12/1986 | Angermüller et al. |
| 5,113,445 A | 5/1992 | Wang |
| 5,214,757 A | 5/1993 | Mauney et al. |
| 5,280,537 A | 1/1994 | Sugiyama |
| 5,329,108 A | 7/1994 | Lamoure |
| 5,385,371 A | 1/1995 | Izawa |

(Continued)

FOREIGN PATENT DOCUMENTS

EP 0 947 953 A2 10/1999

(Continued)

OTHER PUBLICATIONS

U.S. Appl. No. 09/571,422, filed May 15, 2000, Rhoads et al.

(Continued)

*Primary Examiner*—Sheela Chawan
(74) *Attorney, Agent, or Firm*—Digimarc Corporation (57) ABSTRACT

The present invention relates to systems and methods for managing images and related information. In one implementation, geographic information system (GIS) layer information is registered or aligned to an image using digital watermark information embedded within the image.

10 Claims, 9 Drawing Sheets

U.S. PATENT DOCUMENTS

| | | | |
|---|---|---|---|
| 5,499,294 A | 3/1996 | Friedman | |
| 5,502,576 A | 3/1996 | Ramsay et al. | |
| 5,664,018 A | 9/1997 | Leighton | |
| 5,764,770 A | 6/1998 | Schipper et al. | |
| 5,799,082 A | 8/1998 | Murphy et al. | |
| 5,812,962 A | 9/1998 | Kovac | |
| 5,825,892 A | 10/1998 | Braudaway et al. | |
| 5,861,841 A | 1/1999 | Gildea et al. | |
| 5,864,623 A | 1/1999 | Messina et al. | |
| 5,875,249 A | 2/1999 | Mintzer et al. | |
| 5,889,868 A | 3/1999 | Moskowitz et al. | |
| 5,889,898 A | 3/1999 | Koren et al. | |
| 5,901,178 A | 5/1999 | Lee et al. | |
| 5,919,730 A | 7/1999 | Gasper et al. | |
| 5,943,422 A | 8/1999 | Van Wie et al. | |
| 5,958,051 A | 9/1999 | Renaud et al. | |
| 5,964,821 A | 10/1999 | Brunts et al. | |
| 5,987,136 A | 11/1999 | Schipper et al. | |
| 5,990,826 A | 11/1999 | Mitchell | |
| 6,005,936 A | 12/1999 | Shimizu | |
| 6,031,914 A | 2/2000 | Tewfik et al. | |
| 6,081,827 A | 6/2000 | Reber et al. | |
| 6,088,394 A | 7/2000 | Maltby | |
| 6,122,403 A | 9/2000 | Rhoads | |
| 6,130,741 A | 10/2000 | Wen et al. | |
| 6,148,091 A | 11/2000 | DiMaria | |
| 6,175,639 B1 | 1/2001 | Satoh et al. | |
| 6,181,802 B1 | 1/2001 | Todd | |
| 6,185,312 B1 | 2/2001 | Nakamura et al. | |
| 6,205,249 B1 | 3/2001 | Moskowitz | |
| 6,243,480 B1 | 6/2001 | Zhao et al. | |
| 6,246,777 B1 | 6/2001 | Agarwal et al. | |
| 6,249,226 B1 | 6/2001 | Harrison | |
| 6,263,438 B1 | 7/2001 | Walker et al. | |
| 6,282,362 B1 | 8/2001 | Murphy et al. | |
| 6,282,648 B1 | 8/2001 | Walker et al. | |
| 6,289,453 B1 | 9/2001 | Walker | |
| 6,301,360 B1 | 10/2001 | Bocionek et al. | |
| 6,310,956 B1 | 10/2001 | Morito et al. | |
| 6,311,214 B1 | 10/2001 | Rhoads | |
| 6,320,829 B1 | 11/2001 | Matsumoto et al. | |
| 6,324,573 B1 | 11/2001 | Rhoads | |
| 6,332,149 B1 | 12/2001 | Warmus et al. | |
| 6,332,193 B1 | 12/2001 | Glass et al. | |
| 6,341,350 B1 | 1/2002 | Miyahara et al. | |
| 6,343,138 B1 | 1/2002 | Rhoads | |
| 6,351,439 B1 | 2/2002 | Miwa et al. | |
| 6,389,151 B1 | 5/2002 | Carr et al. | |
| 6,401,206 B1 | 6/2002 | Khan et al. | |
| 6,408,082 B1 | 6/2002 | Rhoads et al. | |
| 6,408,331 B1 | 6/2002 | Rhoads | |
| 6,411,725 B1 | 6/2002 | Rhoads | |
| 6,418,232 B1 | 7/2002 | Nakano et al. | |
| 6,427,020 B1 | 7/2002 | Rhoads | |
| 6,448,979 B1 | 9/2002 | Schena et al. | |
| 6,463,416 B1 | 10/2002 | Messina | |
| 6,493,514 B1 | 12/2002 | Stocks et al. | |
| 6,496,802 B1 | 12/2002 | van Zoest | |
| 6,498,984 B2 | 12/2002 | Agnew et al. | |
| 6,504,571 B1 | 1/2003 | Narayanaswami et al. | |
| 6,505,160 B1 | 1/2003 | Levy et al. | |
| 6,512,835 B1 | 1/2003 | Numao | |
| 6,522,770 B1 | 2/2003 | Seder et al. | |
| 6,526,155 B1 | 2/2003 | Wang et al. | |
| 6,529,615 B2 | 3/2003 | Hendrickson et al. | |
| 6,532,541 B1 | 3/2003 | Chang et al. | |
| 6,542,927 B2 | 4/2003 | Rhoads | |
| 6,556,688 B1 | 4/2003 | Ratnakar | |
| 6,614,914 B1 | 9/2003 | Rhoads et al. | |
| 6,625,297 B1 | 9/2003 | Bradley | |
| 6,636,249 B1 | 10/2003 | Rekimoto | |
| 6,650,761 B1 | 11/2003 | Rodriguez et al. | |
| 6,664,976 B2 | 12/2003 | Lofgren et al. | |
| 6,813,368 B1 * | 11/2004 | Khanna et al. | 382/100 |
| 6,847,883 B1 | 1/2005 | Walmsley et al. | |
| 6,993,152 B2 | 1/2006 | Patterson et al. | |
| 7,007,243 B2 * | 2/2006 | Baldino | 715/853 |
| 7,027,612 B2 | 4/2006 | Patterson et al. | |
| 7,042,470 B2 | 5/2006 | Rhoads et al. | |
| 7,061,510 B2 | 6/2006 | Rhoads | |
| 7,098,931 B2 | 8/2006 | Patterson et al. | |
| 7,099,492 B2 | 8/2006 | Rhoads | |
| 7,111,168 B2 | 9/2006 | Lofgren et al. | |
| 2001/0001854 A1 | 5/2001 | Schena et al. | |
| 2001/0019611 A1 | 9/2001 | Hilton | |
| 2001/0022667 A1 | 9/2001 | Yoda | |
| 2001/0023421 A1 | 9/2001 | Messina | |
| 2001/0026377 A1 | 10/2001 | Ikegami | |
| 2001/0026616 A1 | 10/2001 | Tanaka | |
| 2001/0026629 A1 | 10/2001 | Oki | |
| 2001/0030759 A1 | 10/2001 | Hayashi et al. | |
| 2001/0031064 A1 | 10/2001 | Donescu et al. | |
| 2001/0033674 A1 | 10/2001 | Chen et al. | |
| 2001/0034835 A1 | 10/2001 | Smith | |
| 2001/0039546 A1 | 11/2001 | Moore et al. | |
| 2001/0046307 A1 | 11/2001 | Wong | |
| 2001/0051964 A1 | 12/2001 | Warmus et al. | |
| 2002/0001395 A1 | 1/2002 | Davis et al. | |
| 2002/0002679 A1 | 1/2002 | Murakami et al. | |
| 2002/0006212 A1 | 1/2002 | Rhoads et al. | |
| 2002/0009209 A1 | 1/2002 | Inoue et al. | |
| 2002/0044690 A1 | 4/2002 | Burgess | |
| 2002/0046178 A1 | 4/2002 | Morito et al. | |
| 2002/0057340 A1 | 5/2002 | Fernandez | |
| 2002/0059520 A1 | 5/2002 | Murakami et al. | |
| 2002/0065844 A1 | 5/2002 | Robinson | |
| 2002/0069370 A1 | 6/2002 | Mack et al. | |
| 2002/0075298 A1 | 6/2002 | Schena et al. | |
| 2002/0080396 A1 | 6/2002 | Silverbrook et al. | |
| 2002/0095586 A1 | 7/2002 | Doyle et al. | |
| 2002/0095601 A1 | 7/2002 | Hind et al. | |
| 2002/0106105 A1 | 8/2002 | Pelly et al. | |
| 2002/0122564 A1 | 9/2002 | Rhoads et al. | |
| 2002/0124171 A1 | 9/2002 | Rhoads | |
| 2002/0124173 A1 | 9/2002 | Stone | |
| 2002/0126869 A1 | 9/2002 | Wang et al. | |
| 2002/0135600 A1 | 9/2002 | Rhoads et al. | |
| 2002/0136531 A1 | 9/2002 | Harradine | |
| 2002/0147910 A1 | 10/2002 | Brundage et al. | |
| 2002/0159765 A1 | 10/2002 | Maruyama et al. | |
| 2002/0168069 A1 | 11/2002 | Tehranchi et al. | |
| 2002/0191810 A1 | 12/2002 | Fudge et al. | |
| 2003/0011684 A1 | 1/2003 | Narayanaswami | |
| 2003/0012562 A1 | 1/2003 | Lawandy et al. | |
| 2003/0032033 A1 | 2/2003 | Anglin et al. | |
| 2003/0040326 A1 | 2/2003 | Levy et al. | |
| 2003/0048908 A1 | 3/2003 | Hamilton | |
| 2003/0053654 A1 | 3/2003 | Patterson et al. | |
| 2003/0063319 A1 | 4/2003 | Umeda et al. | |
| 2003/0069693 A1 | 4/2003 | Snapp et al. | |
| 2003/0074556 A1 | 4/2003 | Chapman et al. | |
| 2003/0083098 A1 | 5/2003 | Yamazaki et al. | |
| 2003/0090690 A1 | 5/2003 | Katayama et al. | |
| 2003/0215110 A1 | 11/2003 | Rhoads et al. | |
| 2004/0046774 A1 | 3/2004 | Rhoads | |
| 2004/0162981 A1 | 8/2004 | Wong | |
| 2004/0201676 A1 | 10/2004 | Needham | |
| 2004/0221244 A1 | 11/2004 | Baldino | |
| 2005/0086585 A1 | 4/2005 | Walmsley et al. | |
| 2005/0276440 A1 | 12/2005 | Rhoads et al. | |

FOREIGN PATENT DOCUMENTS

| | | |
|---|---|---|
| EP | 0 953 938 A2 | 11/1999 |

| | | |
|---|---|---|
| EP | 935 872 | 11/2001 |
| EP | 1220152 | 7/2002 |
| GB | 2371934 | 8/2002 |
| JP | 2000 41144 A | 2/2000 |
| WO | WO99/17537 | 4/1999 |
| WO | WO 01/05075 | 1/2001 |
| WO | WO01/24113 | 4/2001 |
| WO | WO01/39121 | 5/2001 |
| WO | WO01/76253 | 10/2001 |
| WO | WO02/03328 | 1/2002 |
| WO | WO02/33650 | 4/2002 |

OTHER PUBLICATIONS

Notice of Allowance (dated Dec. 17, 2004), Appeal Brief (dated Sep. 20, 2004) and Office Action (dated May 7, 2004) from parent U.S. Appl. No. 09/800,093.

Notice of Allowance (dated Dec. 17, 2004), Appeal Brief (dated Sep. 20, 2004) and Office Action (dated May 14, 2004) from assignee's U.S. Appl. No. 10/002,954.

Bender et al., "Techniques for Data Hiding," SPIE vol. 2429, Jan. 1995, pp. 164-173.

Caronni, "Assuring Ownership Rights for Digital Images," Published in the Proceedings of 'Reliable IT Systems,' VIS '95, HH. Brüggemann and W. Gerhardt-Häckl (Ed.), Vieweg Publishing Company, Germany, 1995, Jun. 14, 1994, 10 pages.

Carp, "Seven wonders of the imaging world", International Contact, Oct./Nov. 2000, pp. 36/I-36/IV.

"Digital Watermarking, The Unseen Advantage," Geo Informatics, Jun. 2001 (3 pages).

Friedman, "The Trustworthy Digital Camera: Restoring Credibility to the Photographic Image," IEEE Transactions on Consumer Electronics, vol. 39, No. 4, Nov. 1993, pp. 905-910.

http://web.archive.org/web/20010305033241/http://www.kodak.com/country/US/en/corp/researchDevelopment/technologyFeatures/digitalWatermarking.shtml, "Invisible Watermarking", archive date of Mar. 5, 2001 (4 pages, including Internet Archive Wayback Machine cover page).

Koch et al., "Digital Copyright Labeling: Providing Evidence of Misuse and Tracking Unauthorized Distribution of Copyrighted Materials," OASIS Magazine, Dec. 1995, 3 pages.

Manjunath, "Image Processing in the Alexandria Digital Library Project," Proc. IEEE Int. Form on Research and Tech. Advances in Digital Libraries—ADL '98, pp. 180-187.

Seybold Seminars: Keynote: Digital Imaging Day, comments from panel including Daniel Carp, panel discussion occurring on Aug. 28, 2000 (8 pages).

Yeung et al., "Digital Watermarks: Shedding Light on the Invisible," Nov.-Dec. 1998, IEEE Micro vol. 18, No. 6, pp. 32-41.

Zhao et al., "Embedding Robust Labels Into Images for Copyright Protection," Proc. of the International Congress on Intellectual Property Rights for Specialized Information, Knowledge and New Technologies (Vienna, Austria) Aug. 21-25, 1995, 10 pages.

Zhao, "Digital Watermark Mobile Agents," Proc. of NISSC'99, Arlington, VA, Oct. 18-21, 1999, pp. 138-146.

Aug. 30, 2006 Amendment and Aug.23, 2006 Office Action, each from Assignee's U.S. Appl. No. 10/423,489 (published as US 2004-0046774).

Oct. 11, 2006 Supplemental Amendment and Interview Summary; Aug. 11, 2006 Amendment; Aug. 1, 2006 Non-final Office Action, all from assignee's U.S. Appl. No. 11/145,514 (published as US 2005-0276440 A1).

Oct. 13, 2006 Amendment Accompanying RCE from assignee's U.S. Appl. No. 09/833,013 (published as US 2002-0147910 A1).

* cited by examiner

GEOGRAPHIC INFORMATION SYSTEMS USING DIGITAL WATERMARKS

RELATED APPLICATION DATA

This patent application claims the benefit of U.S. Provisional Patent Application Nos. 60/376,720, filed Apr. 29, 2002 and 60/383,474, filed May 23, 2002. This patent application is also a continuation in part of U.S. patent application Ser. No. 09/800,093, filed Mar. 5, 2001 now U.S. Pat. No. 7,061,510 (published as US 2002-0124171 A1). This patent application is also a continuation in part of U.S. patent application Ser. No. 10/002,954, filed Oct. 23, 2001 now U.S. Pat. No. 7,042,470 (published as US 2002-0122564 A1), which is a continuation in part of U.S. patent application Ser. No. 09/800,093, filed Mar. 5, 2001 now U.S. Pat. No. 7,061,510. The 10/002,954 application also claims the benefit of U.S. Provisional Patent Application Nos. 60/284,163, filed Apr. 16, 2001 and 60/284,776, filed Apr. 18, 2001. The present patent application is also a continuation in part of U.S. patent application Ser. Nos. 10/100,233 (published as US 2002-0154144 A1), filed Mar. 13, 2002 now U.S. Pat. No. 6,664,976, and a continuation in part of U.S. patent application Ser. No. 09/858,336, filed May 15, 2001 now U.S. Pat. No. 7,098,931 (published as US 2002-0124024 A1). The 10/100,233 application claims the benefit of U.S. Provisional Patent Application No. 60/284,776. The present patent application is also related to 09/833,013 (published as US 2002-0147910 A1), PCT application PCT/US02/06858 (published as WO 02/071685) and concurrently filed U.S. patent application Ser. No. 10/423,489 (published as US 2004-0046774 A1) titled "Image Management System and Methods Using Digital Watermarks". Each of these patent applications is herein incorporated by reference.

FILED OF THE INVENTION

The present invention relates to image management and processing, and is particularly illustrated in the context of management of satellite and other aerial imagery.

BACKGROUND AND SUMMARY OF THE INVENTION

Acquisition of aerial imagery traces its history back to the Wright brothers, and is now commonly performed from satellite and space shuttle platforms, in addition to aircraft.

While the earliest aerial imagery relied on conventional film technology, a variety of electronic sensors are now more commonly used. Some collect image data corresponding to specific visible, UV or IR frequency spectra (e.g., the MultiSpectral Scanner and Thematic Mapper used by the Landsat satellites). Others use wide band sensors. Still others use radar or laser systems (sometimes stereo) to sense topological features in three dimensions. Other types of image collection rely on electro-optical panchromatic (grayscale), multi-spectral (less than 20 bands) and hyper-spectral (20 bands or more). Some satellites can even collect ribbon imagery (e.g., a raster-like, 1-demensional terrestrial representation, which is pieced together with other such adjacent ribbons).

The quality of the imagery has also constantly improved. Some satellite systems are now capable of acquiring image and topological data having a resolution of less than a meter. Aircraft imagery, collected from lower altitudes, provides still greater resolution.

A huge quantity of aerial imagery is constantly being collected. Management and coordination of the resulting large data sets is a growing problem. Integrating the imagery with related information is also a problem.

In accordance with one aspect of the present invention, digital watermarking technology is employed to help manage such imagery and related information, among other benefits. In another aspect, a digital watermark conveys information that is used to register or align geographic information system (GIS) layers with a corresponding image location, perhaps after the image has been distorted.

The foregoing and additional features and advantages of the present invention will be even more readily apparent from the following detailed description with reference to the following figures.

BRIEF DESCRIPTION OF THE DRAWINGS

FIG. 9b illustrates a geographic information system layer corresponding to the river shoreline of FIG. 9a.

DETAILED DESCRIPTION

For expository convenience, the following section focuses on satellite and aerial "imagery" to illustrate the principles of the invention. The principles of the invention, however, are equally applicable to other forms of captured aerial data and other topographic/mapping information. Accordingly, the term "image" should be used to encompass all such other data sets, and the term "pixel" should be construed to encompass component data from such other data sets.

When new aerial imagery is received, it is generally necessary to identify the precise piece of earth to which it corresponds. This operation, termed "georeferencing" or "geocoding," can be a convoluted art and science.

In many systems, the georeferencing begins with a master reference system (e.g., latitude and longitude) that takes into account the earth's known deformities from a sphere. Onto this reference system the position of the depicted region is inferred, e.g., by consideration of the satellite's position and orientation (ephemeris data), optical attributes of the satellite's imaging system (e.g., resolution, magnification, etc.), and models of the dispersion/refraction introduced by the earth's atmosphere.

In applications where precise accuracy is required, the foregoing, "ephemeris," position determination is refined by comparing features in an image with the placement of known features on the earth's surface (e.g., buildings and other man-placed objects, geological features, etc.) and compensating the georeference determination accordingly. Thus, for example, if the actual latitude and longitude of a building is known (e.g., by measurement from a ground survey—"ground truth"), and the corresponding latitude and longitude of that building as indicated in the georeferenced satellite imagery is different, the reference system applied to the satellite data can be altered to achieve a match. (Commonly, three or more such ground truth points are used so as to assure accurate correction.) Of course these processes can involve both manual and automated steps.

Regardless of the georeferencing techniques used, once determined, a digital watermark can be used to convey geo-coordinates (or other georeferencing information—hereafter both referred to as geo-coordinates). The geo-coordinates can be as simple as longitude and latitude, or can be more finely referenced, e.g., with a geovector as described in our related applications. The georeferencing may also include image scale and/or orientation. A digital watermark can include the geo-coordinates as a message or payload. Or the digital watermark can include an identifier or index that is used to access or interrogate a geo-coordinate database.

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically include two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watennarks in media signals are detailed in the assignee's co-pending U.S. patent application Ser. No. 09/503,881 (now U.S. Pat. No. 6,614,914) and U.S. patent application Ser. No. 6,122,403, which are each herein incorporated by reference. Of course, there are other suitable digital watermarking techniques that can be interchanged with some aspects of the present invention.

One inventive aspect of the present invention is to randomly or pseudo-randomly vary watermark identifiers used by a particular image capture device or watermarking embedder. Or a block of identifiers can be pseudo-randomly generated and then delivered to the watermark embedder. Varying the identifier will help prevent would be pirates from determining which identifiers originate from a particular node or embedding station.

Digital watermarking an aerial image offers a host of advantages. A watermark can be used to convey both static information and dynamic information. Examples of static information are the geo-coordinates of the image depicted in the image, the time and day the image was captured, and a source type indicator. The source type indicator can indicate the imaging source, e.g., governmental or commercial, the imaging sensor used to capture the image, or even the aerial image capture platform and characteristics, e.g., satellite, unmanned aircraft, etc. The source type indicator can be used to regulate access to the image. Of course the static information can be conveyed directly by a digital watermark or can be accessed via a data record associated with or pointed to by the digital watermark identifier. Examples of dynamic information are analyst reports, current weather conditions in the depicted area, notes, current news, video, audio, related images and information, etc.

In our related applications, identified-above, we disclose techniques by which a depicted location area is embedded with a digital watermark so as to unique identify that particular location of a map, image or photograph (e.g., to identify geocoordinates associated with a depicted area, building, road, lake, etc.). An image can be segmented into blocks (or areas). A digital watermark is embedded in each block (or area) to convey (or point to) information that identifies the respective block's center geo-location, boundaries, corners, or object coordinates, etc. A position within the image is determined by reading the digital watermark embedded within a corresponding block.

In some implementations, a block can be further segmented into sub-blocks. Each of the sub-blocks preferably includes the identifying information for its parent block. This sub-blocking technique can provide increased watermark detection robustness. Essentially, when taking an image as a whole, the digital watermark(s) varies from block to block within the image to accommodate the unique identifiers. The block (or area) size can be finely referenced, e.g., a digital watermark can be embedded to uniquely identify a block of pixels and even an area represented by a single pixel.

In other implementations, the image includes an embedded identifier,-which is redundantly embedded throughout the image. The identifier links back to metadata, e.g., to uniquely identify the image or to point to related data.

In some implementations, a plurality of images is "quilted" together to form a mosaic or image composite. The each of the many images preferably retains their unique watermark(s). These watermarks can be used to identify or point to geospatial information. Or the watermark can point to a description file that identifies the geolocation(s) of the depicted area or image patch and/or provides additional information regarding the depicted area.

An inventive aspect of the present invention utilities multiple watermarks in an image to provide a user with geo-reference feedback. Consider the following example. A user pulls up an image on her computer for display on her computer monitor, e.g., perhaps with the aid of image handling or viewing software. The image has been segmented into blocks and the blocks are embedded with a digital watermark to convey (or point to) geocoordinates for the area depicted in the respective block. The segmentation is preferably imperceptible to the user. Each watermark conveys or points to geo-coordinate information that is associated with the block. A software plug-in (or a separate program) cooperates with the image handling software and mouse (or touch screen) to provide user feedback. As the user positions her mouse (e.g., as shown on-screen as a standard "arrow" or pointer), the user is presented with the geo-coordinates associated with the subject location. The presentation can take a myriad of forms ranging, e.g., from text, box-up boxes, graphics, etc. (From a more technical viewpoint, a mouse screen-location position is provided from the mouse (or mouse driver) to the operating system, and then to the image handling software. The image handling software coordinates the screen-location with the displayed image. A digital watermark corresponding to the pointed-to-area or block (i.e., the mouse screen-location position) is decoded to obtain geo-coordinate information, and the geo-coordinate information is presented, perhaps after accessing additional information from a database. As an alternative, each digital watermark (or a group of digital watermarks) within an image is decoded once the image is pulled up on a monitor. The watermark identifier or payloads are associated with a particular displayed area. Then, when a user selects or points to a particular area, the geo-coordinates can be displayed without first having to decode the digital watermark.

Instead of only presenting the user with geo-coordinates, the feedback can be significantly enhanced. Consider, for example, right-clicking the mouse while the cursor is pointed to a particular image location. The right click activates a pop-up window (or separate application, like a media player or Windows Explorer, Internet browser, etc.). The pop-up window provides news broadcasts, if available, audio/video clip, related text that is associated with the location pointed to by the mouse cursor. From another perspective, the digital watermark embedded in the image at the cursor location is decoded. The embedded watermark carries or points to a geolocation. Information associated with the geolocation (or watermark identifier) is identified, e.g., from a database or new source, and is then presented to the user via the window or media player.

(Of course, it should be appreciated that instead of a mouse cursor, a touch screen, touch pen, optical receptor screen (e.g., one activate by a laser pointer), etc. can be used instead of a mouse. Also, our use of the term "right click" is not limiting. Other conventional techniques of activating computer functionality can be suitably interchanged with a "right-click.").

High-resolution images are huge in terms of the digital bytes required to represent the image. Often, such large images are down-sampled in order to efficiently display or print image areas. Down sampling may reduce the image resolution but it also reduces the file or area byte size, making the down sampled image easier to handle. While down sampling provides a faster and perhaps easier way to handle images, it can complicate the watermark detection process. Accordingly, in one implementation, we embedded a digital watermark at different resolutions within the image. Varying the number of pixels used for embedding a watermark component can achieve this "multi-scale" watermark. For example, for a high-resolution scale, a low number of pixels (maybe even only one pixel) is used to convey the watermark component; yet for a lower-resolution scale, the same watermark component is conveyed over a higher number of pixels, like a 6×6 block of pixels, 12×12 block, 16×16 block, 20×20 block, 128×128 block of pixels, etc. Accordingly our watermark is detectable at multiple resolutions.

In another implementation, an embedded digital watermark includes an orientation component. The orientation component preferably provides a reference used to determine a baseline or reference scale for the image. Once reconciled, however, the reference component provides clues to determine the original resolution of the image.

Figure 1:
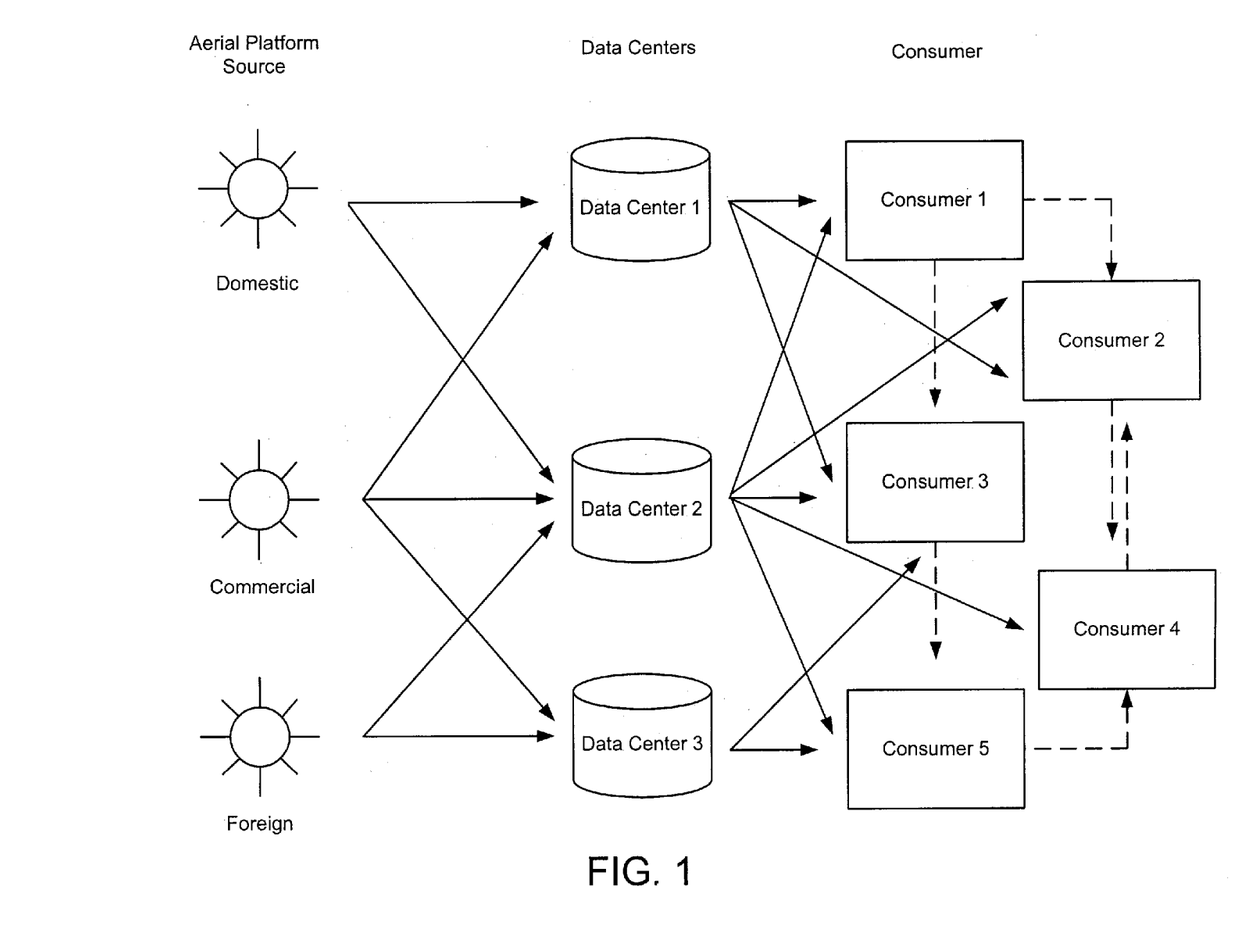
FIG. 1 illustrates an imagery distribution channel.

Digital watermarks form the backbone in an image distribution system (FIG. 1). Satellite imagery is captured from a number of sources, e.g., domestic (e.g., U.S. government), commercial and foreign (e.g., foreign governments). An image is communicated to any one of a number of data centers 1–3 (e.g., corresponding to government, civil and non-government centers). The image is digitally watermarked to include a unique identifier. As discussed, the unique identifier may comprise a geolocation, capture time, or the identifier can be a serial number that is used to link to related information. The embedding preferably occurs prior to storage at a data center, so that the image can be stored and retrieved in the data center via the identifier.

A watermark provides a persistent identifier that is used to manage requests for imagery, as well as tracking and managing the distribution of such images to consumers 1–5. Consumers 1–5 may include government agencies, news and media, corporations, foreign entities, etc., etc. If desired, every action (or a subset of actions) that is carried out on the image can be reported to the data center for logging. For example, if an image is copied to a disk, such action is reported to the data center. Or if the image is cropped, scaled or printed, such is reported and recorded in the data center—thus creating an audit trail for the image. The audit trail can include user or device information as well. The image can be tracked via the identifier even as it is widely distributed. From a system level, a security software module monitors images for a watermark embedded therein. The software module preferably resides on each client system (e.g., computer terminal) in a closed network. Once detected, a watermark is decoded to obtain its identifier. The identifier is reported to a registry or data center, along with the particular action which triggered the decoding (e.g., printing, storing to disk, editing, etc.).

Figure 2:
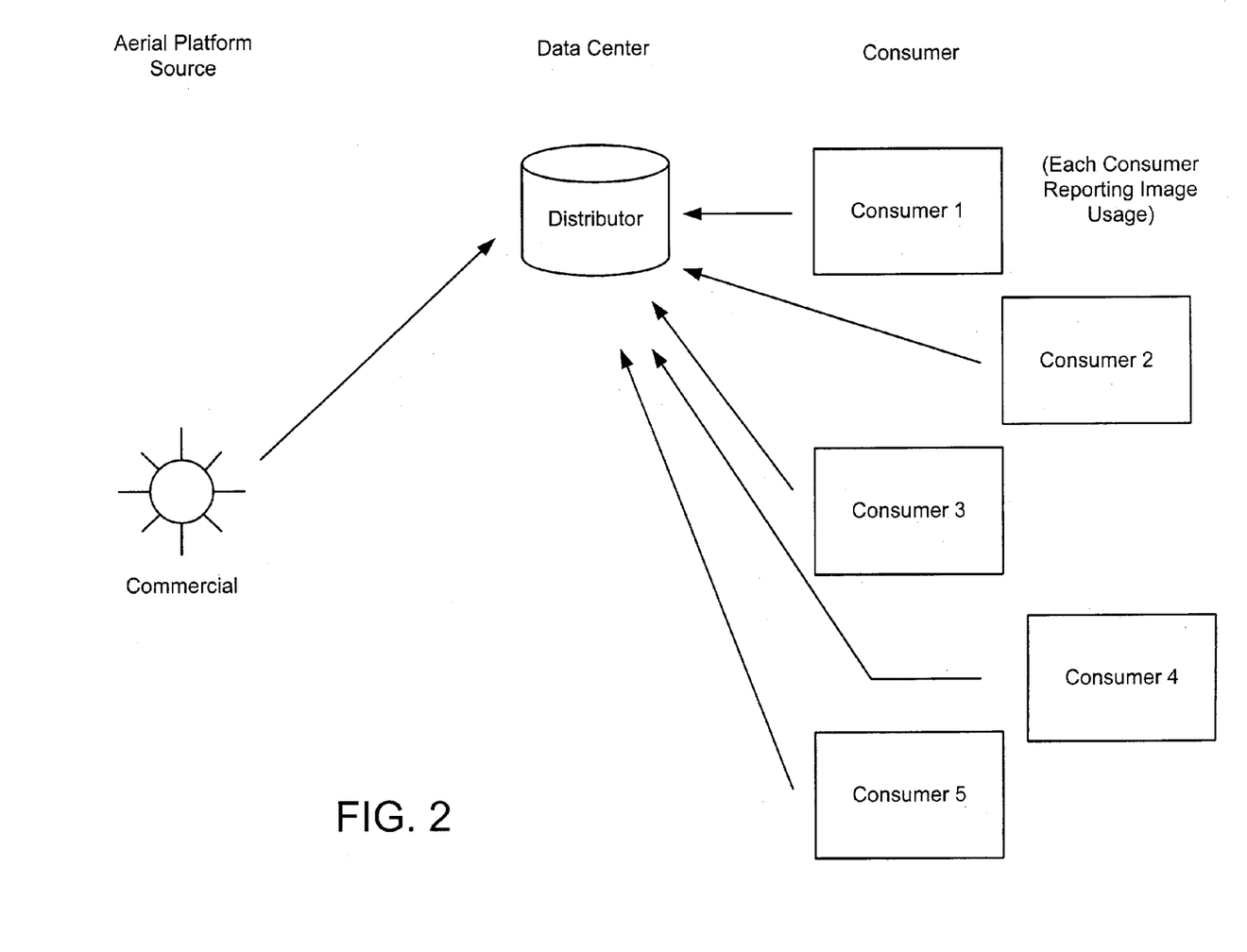
FIG. 2 illustrates license compliance facilitated via digital watermarks.

The digital watermark also simplifies license compliance and reporting. With reference to FIG. 2, images are distributed to a number of consumers 1–5. The consumers can report image usage associated with the digital watermark. (We note that a watermark can also help enforce licensing terms, e.g., by providing copy or viewing restriction flags, by triggering reporting or activity, by limiting access based on environment (e.g., a secure computer or handheld device) or security clearance, etc., etc. The watermark may also be used as a security measure. The watermark can be used to carry security clearance information, or ensure that the related image is not distributed in an unauthorized channel. Regulating software uses information carried by the digital watermark to regulate access or enforce licensing terms, etc.). The digital watermark can also be used to link to compliance information, reporting forms and copyright notices, etc.

Figure 3:
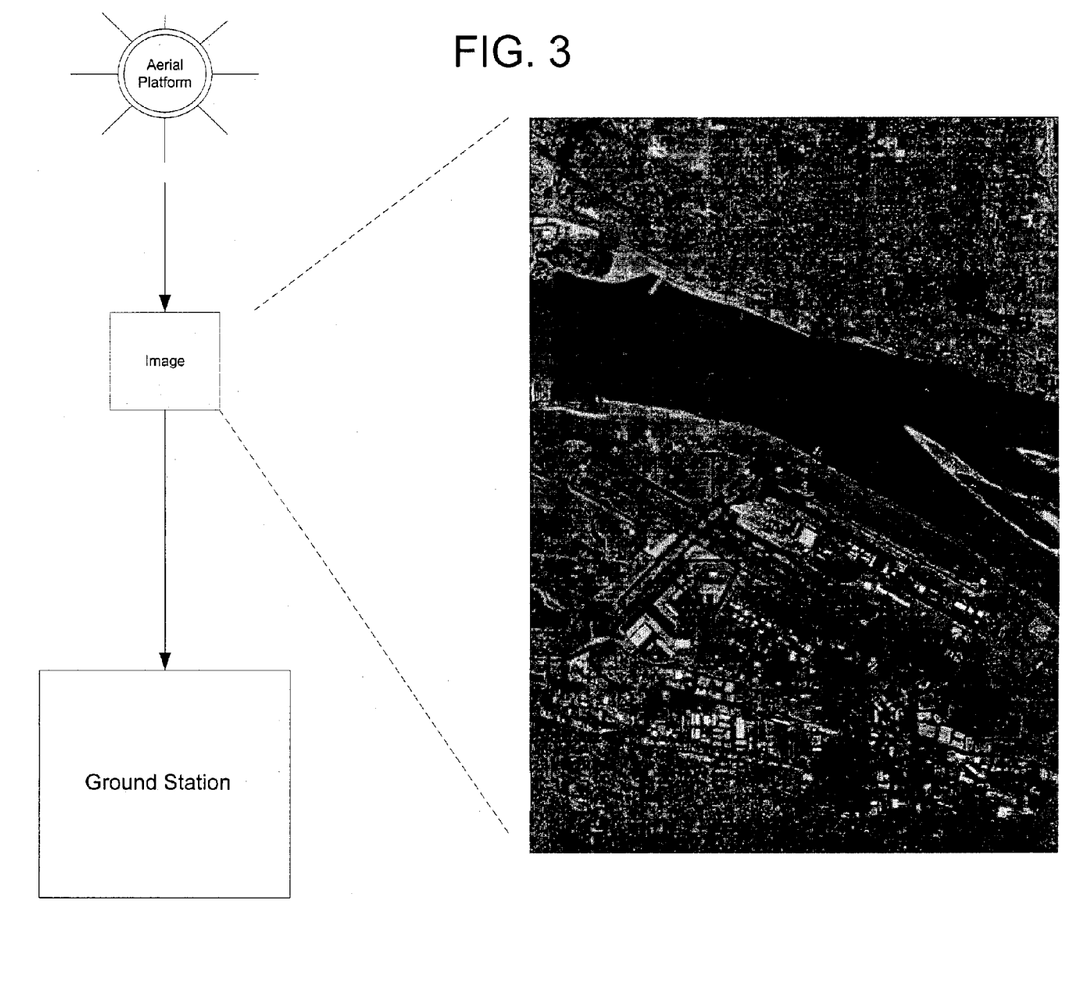
FIGS. 3–7 illustrate an image registration process, including an event broadcast feature.
Figure 4:
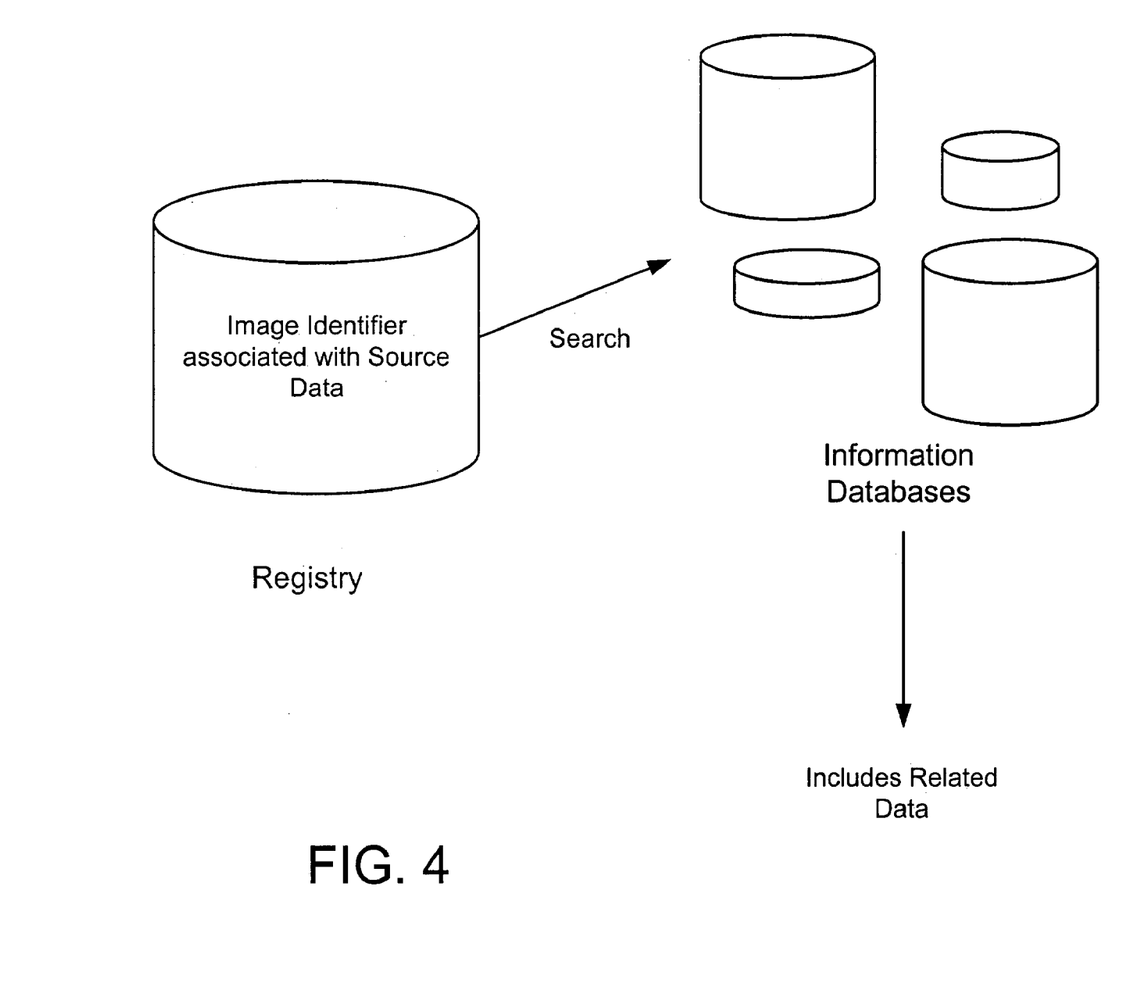

Our watermarks can be used in even more robust settings. Consider the system shown in FIGS. 3–7. An image is captured from an aerial platform (see FIG. 3). The captured image becomes "source data." The source data is digitally watermarked to include a unique identifier as discussed above. We note that a typical image capture method is illustrated in FIG. 3; that is, a satellite captures an image and then communicates the captured image to a ground station. The watermark embedding is preferably carried out at the ground station or at an associated data center or registry. However, as we have discussed in our related applications, the image-capturing platform itself (in the FIG. 3 example, a satellite) can provide the watermark embedding.

The digitally watermarked source data (e.g., the captured image) is stored in a registry. The act of storing the source data in the registry preferably triggers a searching process. (Alternatively, an automatic schedule or manual.input triggers the searching process.) One objective of the searching is to find information that is related to the source data, e.g., via geolocation or depicted subject matter. The types of information are limitless, and can include related images, notes, reports, data, history, news from a broadcast, geographic information system (GIS) layers and libraries, audio or video, imagery in libraries, geo-calibration data, periodicals and current or archived newspapers, current or historical weather, governmental and cultural information, consumer demographics, etc., etc. Searching can be facilitated in a number of ways. For example, the search may include searching for information associated with the source data's watermark identifier. The value of this searching method is particularly evident when the watermark identifier is associated with a geolocation. In alternative searching implementations the searching includes using the depicted geo-coordinates as searching criteria. In other implementations the searching is facilitated by key words associated with depicted areas, associated political regions, associated cultures, depicted structures and/or other information depicted in the source data. The key words can be carried by a digital watermark. The searching becomes fully automated, since a digital watermark decoder can retrieve the key words from a watermark, and then communicate the key words to a search engine associated with specific data libraries. Or suppose, for example, that the source data depicts the Washington Monument. The key word search may involve searching databases, news sources, the internet, etc. for information related to the "Washington monument." Or if the source data depicts Boise, Idaho, a key word search may include the terms "Boise" and/or "Idaho." (Of course, the search can include alternative techniques such as topic searching, directed searching, etc., etc.). The related data, once identified, is associated in the data registry according to the unique identifier. Of course, instead of duplicating the related data, the data repository can include links to or addresses of the related data. Enhanced searching methods, such as those disclosed in assignee's U.S. patent application Ser. Nos. 09/636,102 and 10/118,468 (published as US 2002-0188841 A1), can be implemented to populate the registry as well.

Figure 5:
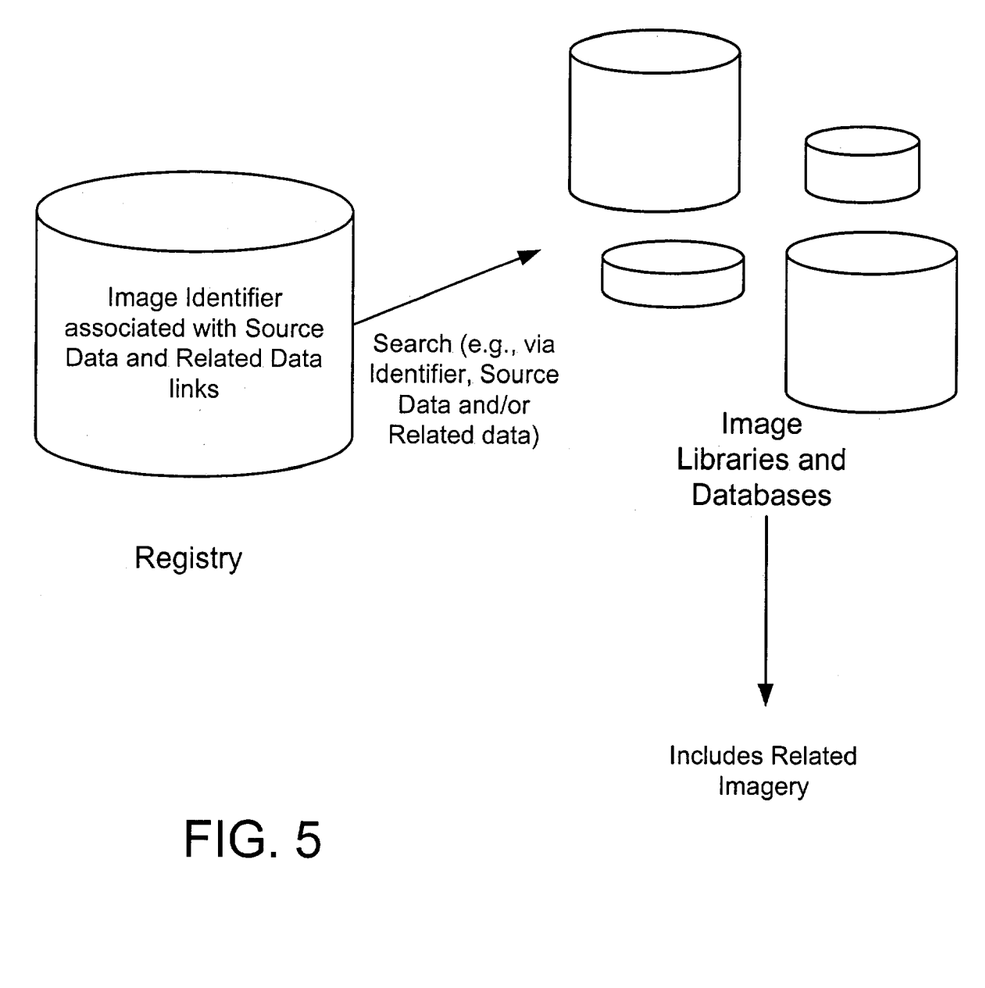

The search can also extend into image libraries. Previously captured images, identified via geo-location or other referencing identifiers, can be associated with the source data as "related imagery." This image-centric search is shown in FIG. 5.

If the embedding is being carried out at ground stations, and not at the data registry, the registry can serve as a unique identifier repository, to help ensure that identifiers do not collide. A ground station can query the registry to obtain an appropriate identifier. Also consecutively assigned identifiers can be pseudo-randomly or randomly varied.

The registry (or perhaps a match filter, as discussed below, or a client software plug in) can also serve as a watchdog or audit tracker. A watchdog limits access to the source data and related data based on security clearance, environment (e.g., whether the requesting party is in a secure facility or out in the field) or device type. A digital watermark can convey environmental limitations or required security clearances that are associated with an image. The registry (or other module) compares the digital watermark information (e.g., indicating security clearance) with the requesting user's or computer terminal's information (e.g., the user's or terminal's security clearance). The image or information is conveyed to user or terminal only if the user's or terminal's clearance or environment is sufficient for the image or information.

An audit tracker serves to log movement and use of a watermarked image. The audit tracker can record access times, a person or terminal accessing the watermarked image, security levels associated with users or terminals accessing the watermarked image, printers at which the image is printed, whether the image is locally downloaded or emailed, etc. The tracking is facilitated with the digital watermark identifier. Once decoded, the identifier is used to access a log or data record. The log is populated with entries as the image is handled, printed, downloaded, etc. Software resident on a user terminal and/or network server can be used to facilitate such monitoring and tracking.

Figure 6:
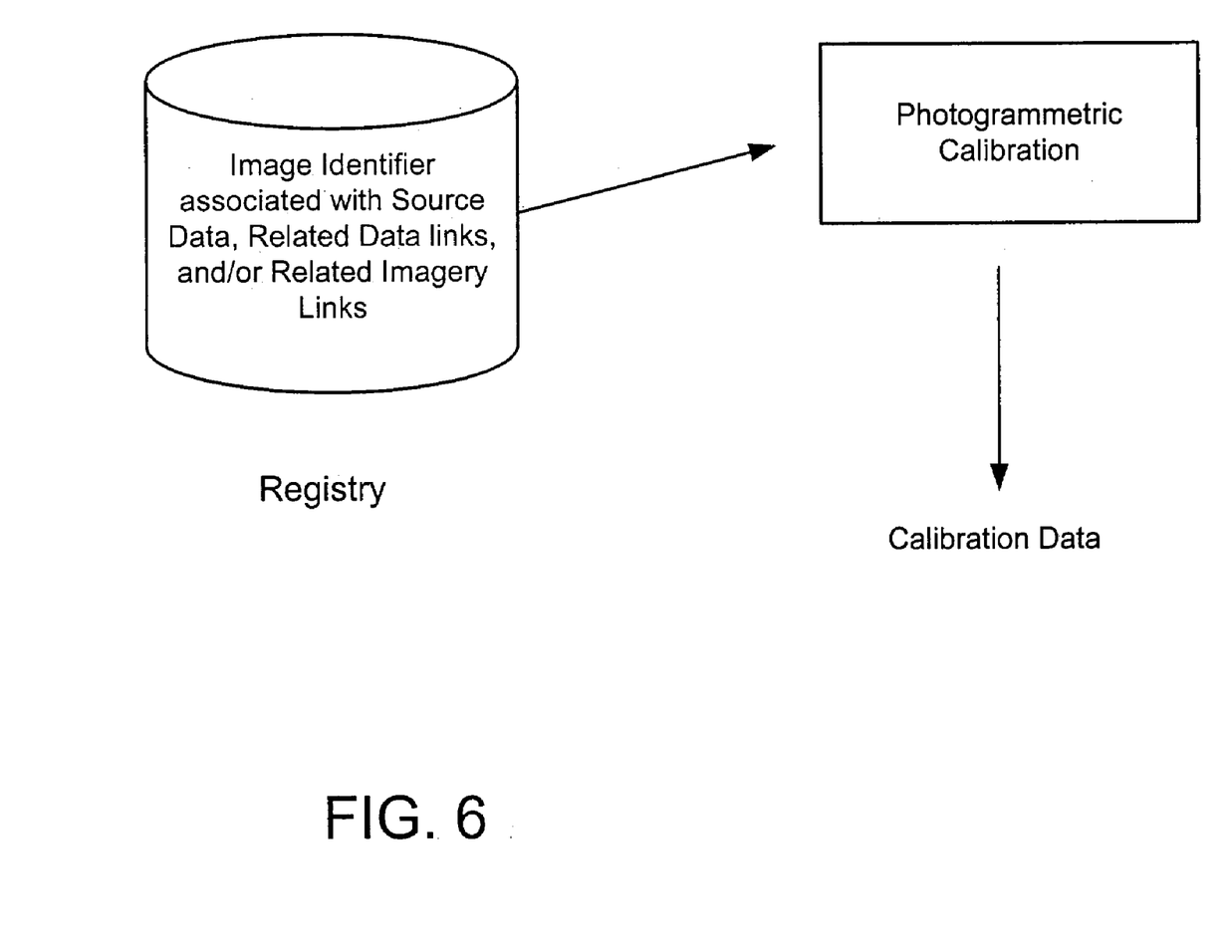

At some point in the registry process, the source data preferably undergoes a georeferencing (or photogrammetric) process (FIG. 6). As discussed in this and in some of our above-identified related applications, the source data undergoes an analysis that maps each image pixel or block of pixels to a geolocation. In one implementation, this process is used to derive a unique watermark identifier or to create geo-coordinates for storage in the registry. The timing of this process is not critical, unless the watermark identifier directly depends on this georeferencing. Otherwise the georeferencing can take place at any time in the registry-populating process.

Figure 7:
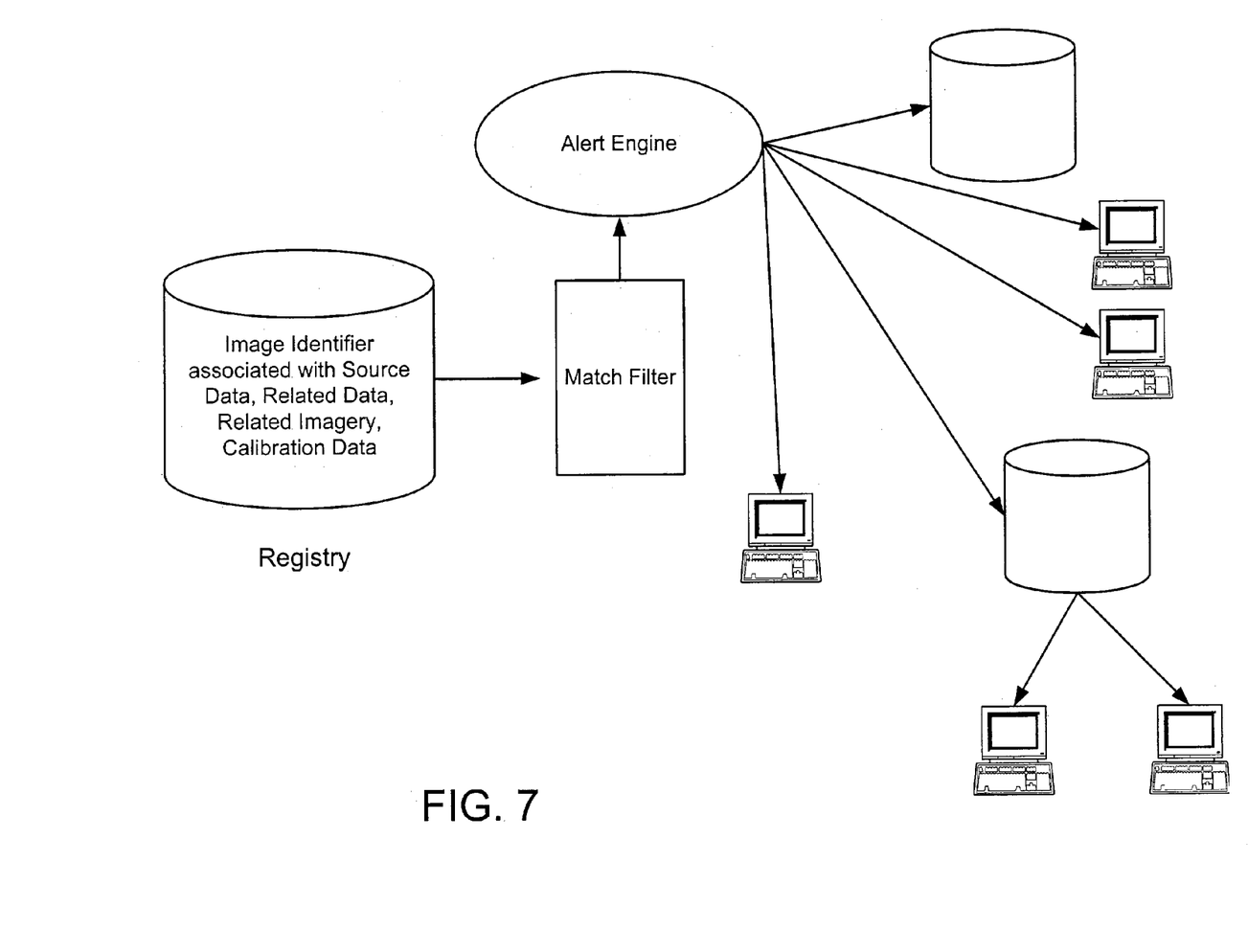

A match filter is used in connection with the registry (FIG. 7). The match filter preferably includes algorithms or protocols to direct information to certain network nodes or terminals. Information can be directed based on predetermined preferences or requests, or by subject matter. Or the match filter can serve as a search engine to allow network nodes to intelligently query the registry. (We note that in some implementations, the registry is distributed and is mirrored as needed. The match filter can be similarly distributed.). In one implementation, the match filter monitors data locations (e.g., such as databases, records, network sites or storage sites) that may include data identified by a watermark identifier or geo-location. New data received at these data locations can be tracked/recorded and optionally announced or pushed to the interested parties. In another implementation, the match filter filters information to users based on a user device that will receive the information. For example, the match filter may determine that a requesting device is a PDA (personal digital assistant) so the match filter sends a copy of the information that is compatible with the PDA. In this manner, the match filter can provide a context sensitive filter. (The term "context sensitive" can also imply security restrictions. For example, while the PDA may be able to process and handle a particular item, it may not be permissible to transmit the data to such a handheld device due to security concerns.).

Figure 8:
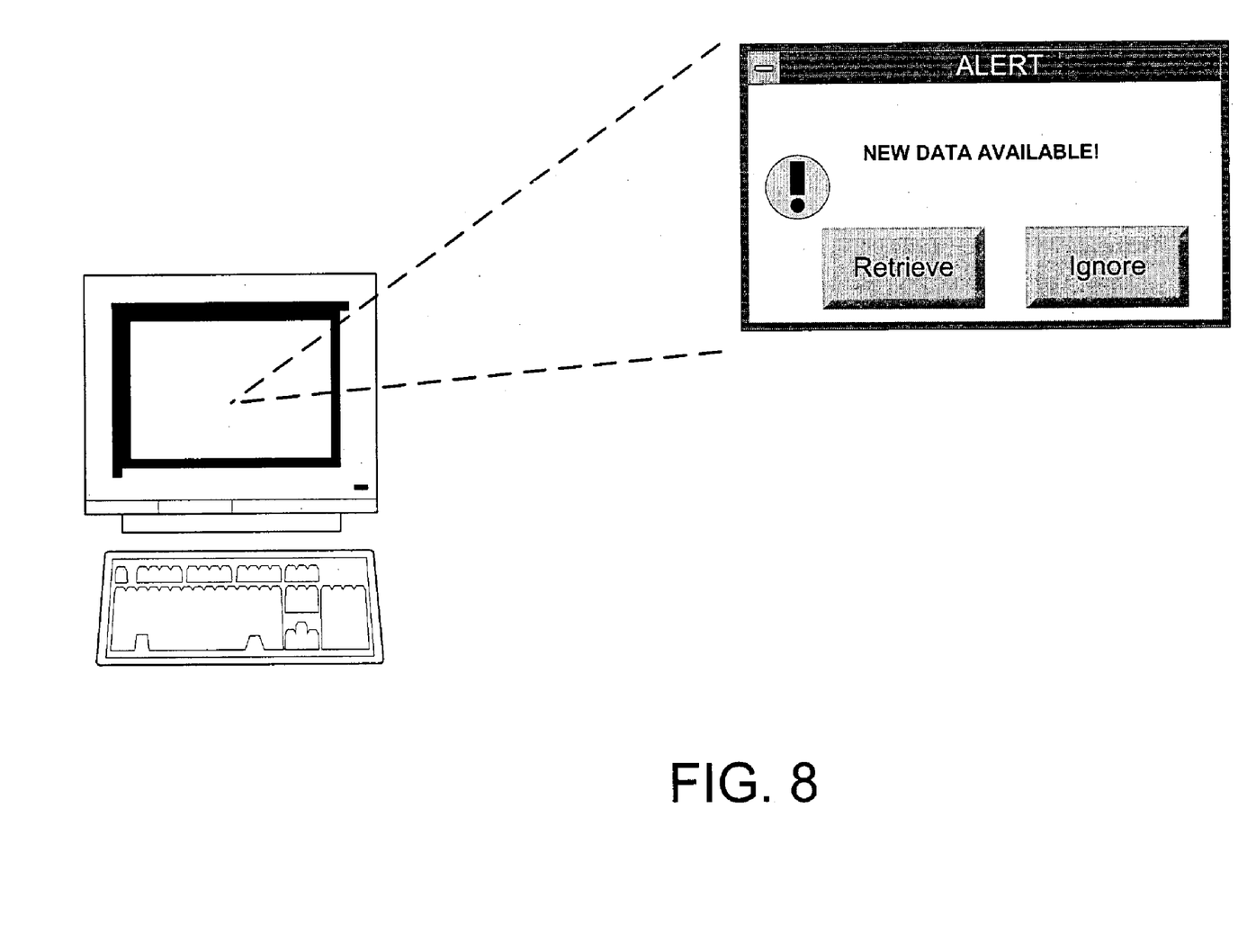
FIG. 8 illustrates a network terminal that has received an alert notification in the FIG. 7 environment.

The match filter can optionally include (or cooperate with) an alert engine. The alert engine monitors the registry and sends out an alert (see FIG. 8) when new or updated information is received in the registry. For example, the alert engine monitors which watermark identifiers (or geo-locations) are communicated to various network nodes. Then, if the registry receives new or updated information that is associated with the identifier, the alert engine sends out a notification or alert to that node. The alert can be manifested in a user terminal/GUI via a pop-up window (e.g., FIG. 8), graphical icon (e.g., a blinking icon in a desktop window or control bar), email, instant message, etc. In another implementation, a network node or terminal schedules an alert request with the alert engine. For example a user may indicate that she would like a notification when updated imagery arrives. The alert process can be relatively seamless for the user. The user terminal (or alert engine) extracts the digital watermark from an image that a user is currently viewing. The alert engine stores this identifier as one to watch for updates. A registry flag (or other indicator) that is associated with the identifier is set when an updated image is received into the registry. The alert engine recognizes the set flag and issues a notification to the user (or user terminal or network address). Or the user can similarly request information based on geo-location. The alter engine can also push fresh information (e.g., recently captured imagery) to a network node or terminal. Or breaking news (e.g., accessible via an internet link or audio/video/text message storage on a network site) can be similarly pushed to interested parties.

Another inventive feature is to allow for removal of an embedded digital watermark from a digital image. For example, there may be some image analysis that requires the original, unwatermarked image. In one implementation, the digital watermark includes a payload. The payload includes a network address or a pointer that points to an original, unwatermarked image. The original, unwatermarked image is obtained with the address or pointer. In another implementation, the digital watermark (or a registry record pointed to by the digital watermark) includes watermark-embedding details (e.g., watermark gain, watermark embedding protocol, tiling data, and/or perceptual masking, etc., etc.), which will allow a watermark remover module to remove the embedded digital watermark. The watermark is decoded to obtain the identifier. The identifier is then used to instruct the watermark embedding information to instruct the removal module in removing the digital watermark. In some alternative implementations, the registry (or other auditing module) records image manipulation, if any, which occur as the image is handled and analyzed. The manipulation data provides clues as to how the original data was manipulated; thus, allowing the manipulation to be reversed. The embedding information and, optionally, manipulation information, helps facilitate the near-perfect removal of the watermark. (In an alternative implementation, the watermark is embedded according to a predetermined rule or protocol, and the removal module removes the watermark according to the predetermined rule or protocol. In other cases we employ a so-called "reversible" watermarking technique, as, e.g., discussed in assignee's U.S. patent application Ser. Nos. 10/3 19,404 (published as US 2003-0149879 A1), 10/319,380 (published as US 2003-0179900 A1), and PCT application no. PCT/US02/40162, published as WO 03/055130).

As indicated, the watermark(s) can identify the imaging system, the date/time of data acquisition, satellite ephemeris data, the identity of intervening systems through which the data passed, etc. One or more watermarks can stamp the image with unique identifiers used in subsequent management of the image data, or in management of meta data associated with the image.

Seal of Completeness

There are additional benefits in creating a georeferenced image registry system using digital watermarks. -Consider the following. A classic notion in most industries is a "stamp" or "seal" or a similar concept to indicate that some object has successfully completed its appointed rounds. Call it branding, call it formality, or call it a soft form of "authenticity;" the historical momentum behind such a branding concept is huge. In one embodiment, to evidence that a given image has been properly georeferenced (under a chosen standard) and/or registered in a database, the image is digitally watermarked. The digital watermark provides a formalized "seal of approval." The digital watermark itself becomes a seal. In one embodiment, a watermark identifier is obtained from an online repository, which issues and tracks authentic identifiers. The repository can be queried to determine the date and time of issue. Or the identifier can be linked to a seal or company logo. Software and/or hardware are configured to routinely read embedded digital watermarks and display an appropriate brand logo, seal, or certification. The "seal" itself then becomes a functional element of a standardization process, serving many functions including permanent attachment to standardized and dynamic metadata.

Geographic Information System

Digital watermarking techniques can be advantageously combined with geographic information systems ("GIS"). GIS combines "layers" of information about a given geographic location to provide a better understanding of that location. What layers of information are combined depends on the purpose, such as finding the best location for a new store, analyzing environmental changes or damage, topology, looking at the acoustic impact to a given area, outlining roads or buildings, evaluating elevation, viewing similar crimes in a city to detect a pattern, and so on. GIS provides tools to query, analyze and map data corresponding to a given spatial location.

Figure 9A:
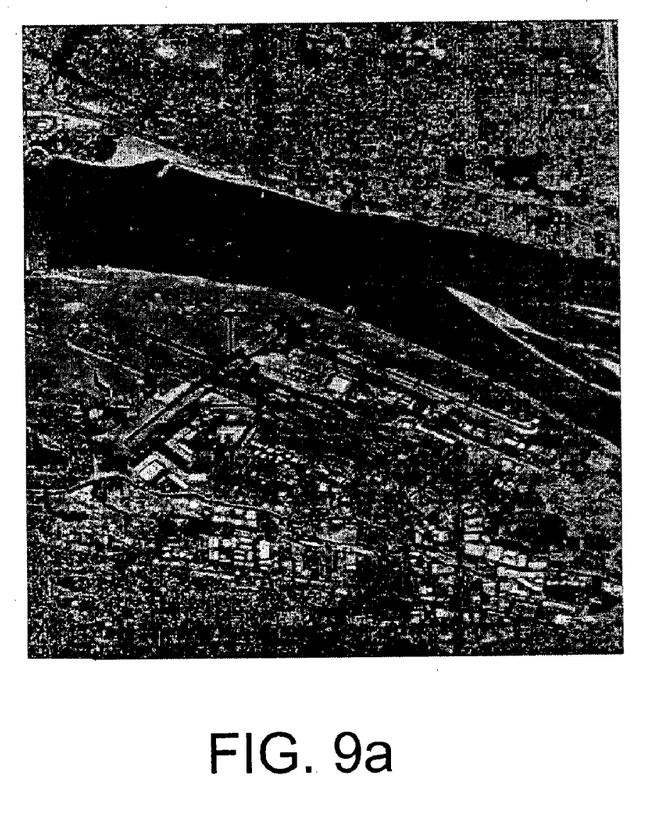
FIG. 9a illustrates an aerial image depicting a river section.
Figure 9B:
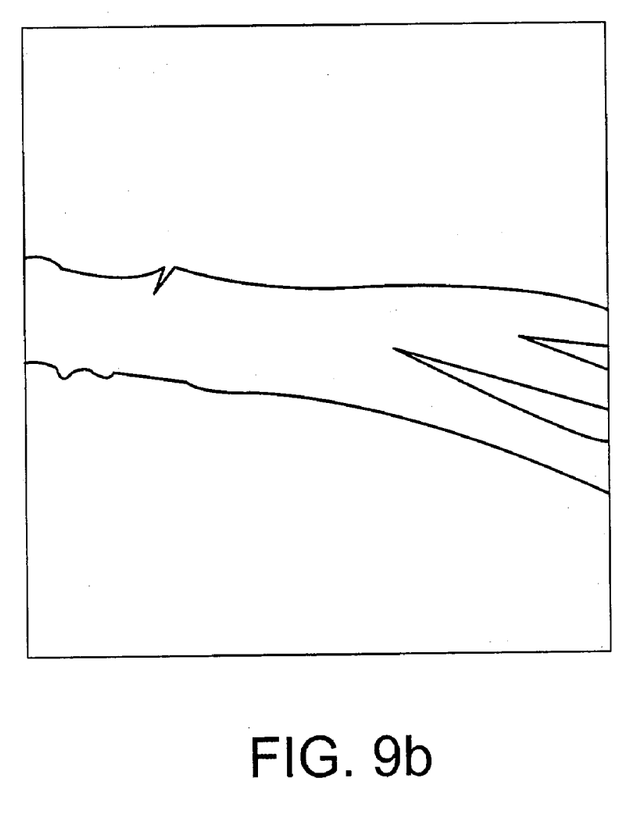

Most commonly, a GIS system includes a general-purpose computer executing GIS software. The GIS software provides functions and tools to store, analyze, and display (e.g., via a graphical user interface) information that is tied to a given geo-spatial location. For example, GIS software may include tools for entering, analyzing, queering and/or manipulating layer information such as roads, buildings, rail roads, shipping lanes, image scale, water resources, vegetation, demographics, land use, cities, city infrastructure, schools and hospitals, rivers or other water bodies, petroleum and natural resources, political lines, cultural information, geographic information, military installations, air lanes, country boundaries, etc., etc., for the given spatial area. The layers may be integrated with or displayed over a base map (perhaps another layer itself) or aerial image. In such cases the layers may be displayed over the image, e.g., as graphics or colors, lines or boxes, colored areas, arcs, lines, points, 3-D effects, images, etc., etc. In other cases the layers may be displayed separately or with only a portion or outline of the base map or image. As a simplified but illustrative example, FIG. 9a shows an aerial image depicting a river section. FIG. 9b illustrates one possible layer that is associated with the FIG. 9a image. The FIG. 9b layer outlines the river's shoreline as depicted in FIG. 9b. A GIS system may display the FIG. 9b layer separate from the image, or may "overlay" the FIG. 9b layer (e.g., represented in a color outline, etc.) on top of the FIG. 9a image. Other layers for the FIG. 9a image may include, e.g., a historical view of the shoreline, e.g., as of 100 years ago (helpful in showing river migration or erosion); airport or road positions, population density; and/or fish habitats, etc, etc.

GIS software typically includes (or cooperates with) a database management system. The database helps maintain layer information. Most GIS systems include a graphical user interface (GUI) to display layer information, perhaps displayed over an image or base map. GIS layer information can be presented via the GUI in various formats. GIS software is available from, e.g., ESRI (e.g., ArcView), Erdas (e.g., Imagine), Sensor System (e.g., RemoteView), 3DI Geographic Technologies, Apic, RMSI, AutoDesk MapGuide, Mapinfo MapXtreme, ArcIMS (Internet Map Server) etc., etc. Further background information regarding GIS can be found with reference to, e.g., U.S. Pat. Nos. 6,542,813 and 6,389,356; U.S. Published patent application Ser. Nos. 20,030,014,185 and 20,020,145,620 (such patent documents are herein incorporated by reference); and on the internet at, e.g., www.gis.org and www.gis.com.

GIS systems typically organize layer information using two primary techniques—raster data and vector data. Raster data provides storage, processing and display of spatial data.

A depicted area is divided into rows and columns, which form a grid structure. Cells within this grid structure contain an attribute value as well as location co-ordinates. The spatial location of each cell is implicitly conveyed by the ordering of the grid, unlike a vector structure that stores topology explicitly Vector data includes lines and/or arcs, defined by beginning and end points, which meet at nodes. The locations of nodes and the topological structure are typically stored explicitly. Features are usually defined by their boundaries and curved lines are represented as a series of connecting arcs. A vector data example is a file including property boundaries for a housing subdivision.

GIS layer information is registered, or correlated to, a corresponding spatial location on an image (or map). (Layer data may also undergo projection conversions, for example, that integrates a layer into a GIS. Projection is a mathematical technique used to transfer information from the Earth's three-dimensional curved surface to a two-dimensional medium such as a computer screen.). We have found that digital watermarks can be used for GIS layer registration (or spatial alignment with an image). For example, a digital watermark may convey or identify an image position that should correspond with a particular raster cell (e.g., the first cell) or with a vector node (or beginning or ending point). Or a digital watermark can provide other orienting components to help align or register layer information onto or with a corresponding image. In some implementations, layer information (or a layer itself) is associated with a particular image via a digital watermark identifier. Returning to the FIGS. 9a and 9b example, the FIG. 9a image may include a digital watermark embedded therein. The digital watermark includes an identifier, which is used to interrogate a GIS database to find the FIG. 9b layer. The digital watermark may even convey orientation information to help spatially register the layer with the image.

Now consider a situation where an image is manipulated or distorted. For example, the image is scaled, rotated and/or cropped. Any GIS layer information that was once registered is now likely out of alignment with respect to the manipulate image. An improvement is to use a digital watermark to effectively reregister the GIS layer information to the manipulated image. In a first implementation, we use a so-called orientation component carried by the digital watermark to determine the relative scale of the manipulated image (see, e.g., assignee's U.S. patent application Ser. No. 09/503,881 and U.S. Pat. No. 6,122,403, which are each herein incorporated by reference for an ever further discussion of watermark-based orientation). Geo-coordinate information is retrieved from a watermarked (but manipulated) image block to identify the depicted image block location. Decoding several of such watermarked image blocks, and knowing the relative scale from the orientation component, can be used to help accurately reregister the layer information. In another implementation, at least one digital watermark component is analyzed to determine the scale of the manipulated image. The GIS layer information is adjusted accordingly. In still another implementation, decoded digital watermark information is used to identify a location(s) in the manipulated image, and GIS layer information corresponding to the location(s) is mapped (or projected) to the identified location(s). Accordingly, we use a digital watermark to reregister GIS layer information when an image is manipulated. In other implementations, the digital watermark decoder recognizes via the orientation component that an image includes some distortion. The image is realigned prior to GIS layer overlay. In other implementations the digital watermark will include a spatial position indicator. A GIS layer can be aligned with an image based on the position indicator. For example, if the image is cropped, and a particular GIS layer based its registration to the image on the image's left upper corner, the layer registration would be lost. However, if a digital watermark conveys a spatial position indicator, the layer can base its registration from the watermark position indicator. Sometimes a spatial position indicator will be the presence of a watermark in a given image region (e.g., a watermark is embedded in a region depicting a lake or road). Other times the spatial position indicator will be conveyed through a watermark payload, perhaps identifying the spatial position indicator as a distance from an image object. Of course other spatial position indicators can be conveyed via a digital watermark as well.

In another implementation, we provide a digital watermark decoding plug-in, which cooperates with a GIS software program. The plug-in searches an aerial image for a digital watermark embedded therein. The digital watermark includes an identifier. Once decoded from the digital watermark, the identifier is passed to the GIS software (or perhaps directly to a database), which accesses a GIS database including a plurality of information layers. A layer (or a set of layers) associated with the digital watermark is identified with the identifier. The layer (or set of layers) is provided to the GIS software for use with the image. If the watermark includes a registering component, the layer is aligned or registered with the image via the registry component.

Persistent Information Notation

One aspect of the present invention is a Persistent Information Notation (or "PIN") that is embedded in an image. We liken our PIN to an electronic sticky note. The PIN links the watermark to a registration database. Once decoded, the PIN is used to interrogate the registration database to locate, e.g., related metadata. Watermarked imagery is made available for display on an image analyst's computer workstation. During display, the analyst can access and append additional imagery and textual information relevant to the currently displayed scene—stored in the database—via the watermark embedded PIN. The watermark is preferably robust. For example, the PIN survives even if the watermarked imagery is printed and scanned back into digital form. The PIN can be used to gather disparate or disassociated image-related information (e.g., by storing them in a data record associated with the PIN), and append relevant information to the watermarked image or image chip for dissemination to downstream analysts (e.g., by storing the relevant information to be accessible via the PIN).

A PIN implemented with digital watermarking provides the capability to add identifying information and link dynamic information to an image and its derivative images in a robust fashion and with increased survivability.

Illustrative Scenario involving a PIN

Upon initial analysis a first image analyst adds commentary to an image. The commentary resides in a database, which is linked to the image via an embedded watermark PIN. As the image continues in its lifecycle, a second analyst is provided an image chip (e.g., an image segment or a derivative from the image) corresponding to the image. The second analyst accesses related information, including the original image, via the embedded watermark PIN. The second analyst also appends and updates the annotations in the database record that is associated with the PIN. Next, a printed image is generated and passed to a third analyst for further hard copy exploitation. This printed image is not delivered with a complete set of notes. Using a scanner or input imaging device (e.g., a PC camera, digital camera, flatbed scanner, etc.), the third analyst reads the digital watermark (and PIN) from the image, and links to the database via PIN. (See, e.g., assignee's U.S. Pat. Nos. 6,324,573, 6,371,214, 6,286,036, 6,122,403 and 5,841,978 and U.S. patent application Ser. No. 09/571,422, filed May 15, 2000, which are each herein incorporated by reference, for various linking techniques.). Thus, the third analyst gains full knowledge of the image-relevant information that she is cleared to access. (In this regard, the analyst may need to present her security level credentials prior to image access. The PIN may include a required security clearance needed to access the related information. If the security level credentials match the PIN's security level, access is allowed.). Finally, a fourth analyst wants to use the image and associated comments for producing a report. However, loss of image header information makes it impossible to determine the image source, location, or the age of the image. The fourth analyst decodes the watermark PIN in a digital copy of the image (e.g., perhaps through an automated process initiated via right-clicking on a displayed copy of the image). The PIN is used to link to the related information. The linked information is used to access the stored information. The stored, related information may include other image data relevant to the image; latitude and longitude of the source image; a list of other images and reports related to the source image. The report can now be generated.

Some conventional systems for accessing imagery and related information require that an image have "attached" to it some identifying information. In many situations the attached information is easily separated from the image; therefore, identification of the imagery, retrieval of its ancestors, and retrieval of related text information, is difficult or even impossible. Our techniques embed a digital watermark component in an image as a persistent image identifier and thus mitigate impact due to notation loss, change in file format, or loss of header data.

(We note that while we use the term "PIN" above to represent a persistent identifier, the term PIN can also be used to represent information stored in a database that is associated with a persistent identifier.).

CONCLUSION

The foregoing are just exemplary implementations of the present invention. It will be recognized that there are a great number of variations on these basic themes. The foregoing illustrates but a few applications of the detailed technology. There are many others.

Some watermarks used in the foregoing embodiments can be "fragile." That is, they can be designed to be lost, or to degrade predictably, when the data set into which it is embedded is processed in some manner. Thus, for example, a fragile watermark may be designed so that if an image is JPEG compressed and then decompressed, the watermark is lost. Or if the image is printed, and subsequently scanned back into digital form, the watermark is corrupted in a foreseeable way. (Fragile watermark technology is disclosed, e.g., in application Ser. Nos. 09/234,780, 09/433,104 (now U.S. Pat. No. 6,636,615), Ser. No. 09/498,223 (now U.S. Pat. No. 6,574,350), Ser. No. 09/562,516, 09/567,405, 09/625,577 (now U.S. Pat. No. 6,788,800), and Ser. No. 09/645,779 (now U.S. Pat. No. 6,714,683). Each of these patent applications is herein incorporated by reference.) By such arrangements it is possible to infer how a data set has been processed by the attributes of a fragile watermark embedded in the original data set.

To provide a comprehensive disclosure without unduly lengthening this specification, applicants incorporate by reference, in their entireties, the disclosures of the above-cited U.S. patents and applications. The particular combinations of elements and features in the above-detailed embodiments are exemplary only; the interchanging and substitution of these teachings with other teachings in this application and the incorporated-by-reference patents/applications are contemplated.

There are many embodiments discussed herein which may benefit from the inclusion of two different watermarks. For example, a first watermark may include information evidencing (or pointing to) georeferencing information, while a second watermark includes a database identifier or location. The second watermark may alternatively include (or point toward) information pertaining to events, people or animals identified in the photograph, occasions, groups, institutions, copyright ownership, etc. Or an image may include both a robust watermark and a copy-tamper fragile watermark.

Also, while the presently preferred embodiments have focused on images, the present invention is not so limited. Indeed, audio and video can be embedded with geolocation information to identify the captured (or broadcast) location and, in the case of video, a location depicted in the video. The system shown in FIGS. 3–8 can be adapted to handle such geolocation embedded audio and video.

Although not belabored, artisans will understand that the systems described above can be implemented using a variety of hardware and software systems. One embodiment employs a computer or server with a large disk library, and capable database software (such as is available from Microsoft, Oracle, etc.). The registration, watermarking, and other operations can be performed in accordance with software instructions stored in the disk library or on other storage media, and executed by a processor (or electronic processing circuitry) in the computer as needed. (Alternatively, dedicated hardware, or programmable logic circuits, can be employed for such operations.).

In view of the wide variety of embodiments to which the principles and features discussed above can be applied, it should be apparent that the detailed embodiments are illustrative only and should not be taken as limiting the scope of the invention.

What is claimed is:

1. A geographic information system (GIS) comprising a computer including a display, electronic processing circuitry and memory in communication with the electronic processing circuitry, wherein the memory includes an information layer associated with an image, an improvement comprising: a digital watermark embedded in the image, the digital watermark including an identifier; digital watermark decoding instructions stored in said memory for execution on said electronic processing circuitry; and software instructions stored in said memory for execution on said electronic processing circuitry, said software instructions comprising instructions to: initiate decoding of the digital watermark from the image to obtain the identifier; locate the information layer based on at least the obtained identifier; and display the information layer relative to the image via said display.

2. The geographic information system of claim 1, wherein said memory comprises random access memory and mass storage.

3. The geographic information system of claim 1, wherein the digital watermark further comprises an orientation component, and said digital watermark decoding instructions comprise instructions to determine distortion based on the orientation component, said software instructions further comprising instructions to register the information layer according to the distortion.

4. The geographic information system of claim 1, wherein the digital watermark further comprises an orientation component, and said digital watermark decoding instructions comprise instructions to determine distortion based on the orientation component, said software instructions further comprising instructions to adjust the image to compensate for the distortion.

5. The geographic information system of claim 1, wherein the digital watermark further comprises a registration indicator, and said digital watermark decoding instructions comprise instructions to determine a spatial image position indicated by the registration indicator, said software instructions further comprising instructions to register the information layer relative to the image in accordance with the registration indicator.

6. A method comprising:
   decoding a digital watermark embedded in an image, the digital watermark comprising at least an identifier;
   identifying a geographic information system (GIS) layer which is associated with the image; and
   providing the GIS layer for display, correlation with the image, or communication.

7. The method of claim 6, wherein the digital watermark further comprises an orientation component, and said method further comprises:
   determining whether the image comprises distortion based on an analysis of the orientation component; and
   adjusting the image to compensate for the distortion.

8. The method of claim 6, wherein the digital watermark further comprises an orientation component, and said method further comprises:
   determining whether the image comprises distortion based on an analysis of the orientation component; and
   adjusting the GIS layer to compensate for the distortion.

9. The method of claim 6, wherein the digital watermark comprises a registration indicator, said method further comprising: spatially aligning the GIS layer relative to the image based at least in part on the registration indicator.

10. A method comprising:
    handling a digitally watermarked image, a digital watermark embedded in the image conveying at least a spatial location reference for an area depicted in the image; and
    registering or aligning geographic information system information with the digitally watermarked image using at least the digital watermark spatial location reference.

* * * * *